Dec. 20, 1966   A. P. MORABITO   3,292,560
DOUGH PROOFER
Filed Dec. 20, 1963   2 Sheets-Sheet 1
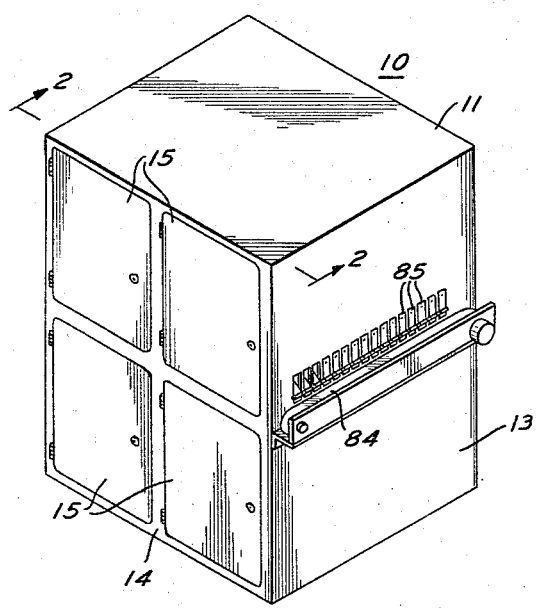
FIG. 1
FIG. 3
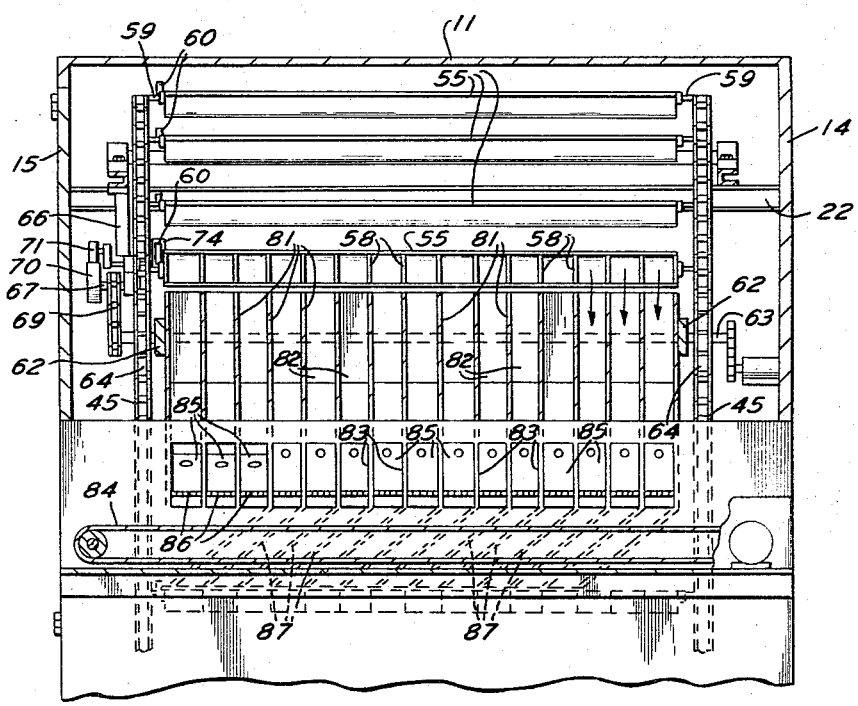
INVENTOR.
ANTHONY P. MORABITO
BY
ATTORNEY Dec. 20, 1966   A. P. MORABITO   3,292,560
DOUGH PROOFER
Filed Dec. 20, 1963   2 Sheets-Sheet 2
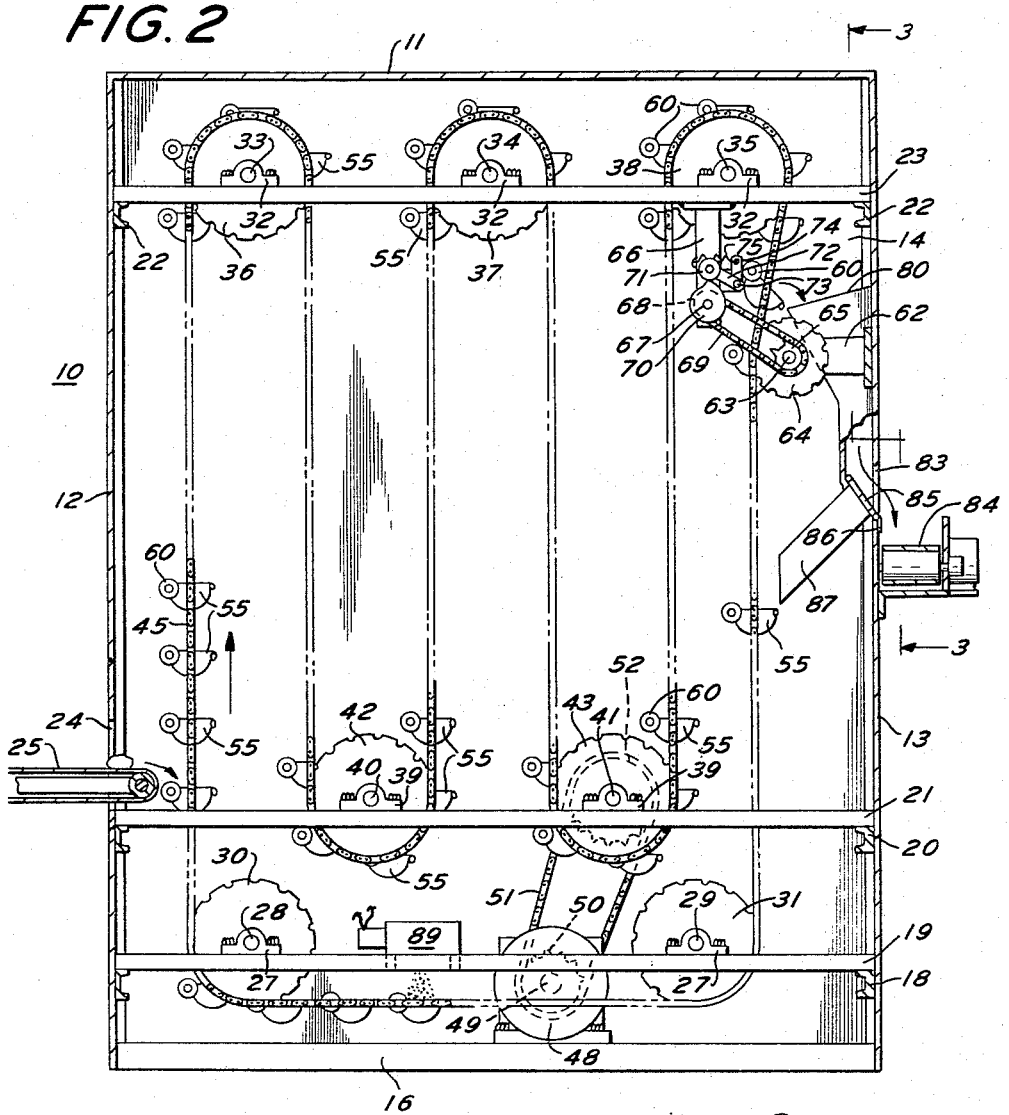
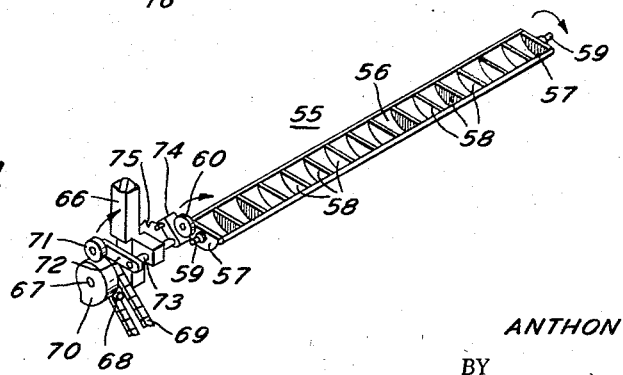
INVENTOR.
ANTHONY P. MORABITO
BY
ATTORNEY United States Patent Office 3,292,560
Patented Dec. 20, 1966

3,292,560
DOUGH PROOFER
Anthony P. Morabito, % Topos Mondial Corp.,
755 Kohn St., Norristown, Pa. 19401
Filed Dec. 20, 1963, Ser. No. 332,097
6 Claims. (Cl. 107—7)

This invention relates to dough proofers.

In the baking of rolls after the dough has been mixed, cut to the desired size and shaped, it is necessary to permit the dough to rise for a selected time interal in an atmosphere preferably controlled as to temperature and humidity.

No satisfactory apparatus of simple character has heretofore been available in which dough for rolls can be proofed for a selected interval.

It is the principal object of the present invention to provide a dough proofer which is simple in construction, reliable in its operation and in which the operator can select the time interval desired for proofing.

It is a further object of the present invention to provide a dough proofer having an inlet and a plurality of outlets for selective delivery at any one of a plurality of time intervals of proofing.

It is a further object of the present invention to provide a dough proofer in which the dough to be proofed passes through a plurality of cycles, with a transfer at the end of each cycle and with delivery of the dough at the end of a selected cycle.

It is a further object of the present invention to provide a dough proofer in which a plurality of movable trays in rows are employed, with successive transfer along each row in a simple but effective manner, and as determined by the desired proofing time interval.

It is a further object of the present invention to provide a dough proofer as aforesaid which is suitable for use in medium and small size bakeries but which can also be employed in very large bakeries.

Other objects and advantageous features of the invention will be apparent from the description and claims.

The nature and characteristic features of the invention will be more readily understood from the following description taken in connection with the accompanying drawings forming part thereof, in which;

FIGURE 1 is a view in perspective of a dough proofer in accordance with the invention as seen from the delivery end;

FIG. 2 is a vertical sectional view, enlarged, taken approximately on the line 2—2 of FIG. 1;

FIG. 3 is a fragmentary vertical sectional view, taken approximately on the line 3—3 of FIG. 2: and FIG. 4 is a view in perspective of one of the trays and the tilting mechanism therefor.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, and as shown in FIG. 1, an outer enclosing housing 10 is provided so that the desired environment can be maintained in the interior. The housing 10 as will be seen in FIGS. 1, 2 and 3 has a top wall 11, a vertical front or entrance wall 12, a vertical rear or delivery wall 13, and vertical side walls 14, at least one of which can have hingedly mounted doors 15 thereon for access to the interior.

Within the interior of the housing 10, a frame is provided which includes a base or frame 16, lower horizontal frame bars 18 and 19, intermediate frame bars 20 and 21 and upper frame bars 22 and 23, the frame bars 18 to 23, inclusive, being disposed along the walls 12, 13 and 14.

The entrance wall 12 is preferably provided with an opening 24 through which a supply conveyor belt 25 extends for delivery of cut and shaped pieces of dough, such as those for making rolls, the dough being transversely arranged in a predetermined number which for purposes of explanation will be taken as three.

The lower frame bars 19 at each side have spaced bearing blocks 27 secured thereto for the support of shafts 28 and 29 upon which sprockets 30 and 31 are mounted.

The upper frame bars 23 at each side have spaced bearing blocks 32 secured thereto for the support of shafts 33, 34 and 35 upon which sprockets 36, 37 and 38 are carried.

The intermediate frame bars 21 at each side have spaced bearing blocks 39 secured thereto for the support of shafts 40 and 41 upon which sprockets 42 and 43 are carried.

Continuous roller chains 45 are provided on the sprockets on each side. It will be noted that the chains 45 extend over the sprockets 36, under the sprockets 42, over the sprockets 37, under the sprockets 43, over the sprockets 39, under the sprockets 31 and 30 and then as before.

In order to drive the chains 45 at the desired speed a motor 48 is provided, mounted on the base 16. The motor 48 has a shaft 49 with a sprocket 50 thereon which is connected to any desired part of the chain assembly by a driving roller chain 51. A sprocket 52 on the shaft 41 can have the chain 51 engaged therewith.

The chains 45 have pivotally carried thereby a plurality of horizontal trays 55. The trays 55 have a curved body portion 56 with end walls 57, intermediate partition walls 58, and pivot pins 59 extending from the end walls 57 for pivotal mounting of the trays 55. Each of the trays 55 at one end thereof has a tilt wheel 60 on an end wall 57.

The wall 13 has spaced brackets 62 carried thereby for supporting a shaft 63 on which positioning sprockets 64 are mounted for positioning the chains 45 and the trays 55 moved therewith below the sprockets 38. The shaft 63 has secured thereto a sprocket 65.

The frame bar 23 extending downwardly therefrom has a support 66 in which a shaft 67 is mounted. The shaft 67 has a sprocket 68 thereon connected by a roller chain 69 to the sprocket 65 and has a cam 70 thereon. A cam follower 71, engaging the cam 70 is carried on an arm 72 which is carried by a pivot pin 73 on the support 66. The arm 72 has an arm 74 movable therewith and engageable by the tilt wheel 60 when the follower 71 is raised by the cam 70. A spring 75 normally urges the arm 74 toward retracted position and holds the follower 71 in engagement with the operating face of the cam 70.

The wall 13 has carried thereby a transfer hopper 80 having vertical partition walls 81 which provide passageways 82 one for each compartment in the trays 55. The wall 13, has a plurality of openings 83 for effecting the discharge of the proofed dough pieces onto a delivery conveyor belt 84 along the exterior of the wall 13.

In order to control the delivery of the proofed dough pieces doors 85 are provided hinged at 86 along their lower margins which can be tilted rearwardly to effect delivery of the proofed dough pieces or can be disposed vertically.

Extending downwardly and in offset relation to groups of passageways 82 and controlled by the positioning of the doors 85 a plurality of walls 87 are provided which form chutes to transfer dough pieces to offset locations in the trays 55 for further proofing.

If desired vibratory flour supplier 89 can be employed for sifting a small quantity of flour into the trays 55 as they pass therebelow.

The mode of operation will now be pointed out.

For purposes of explanation the time period for one complete movement of the chains 45, and accordingly of any particular tray 55 carried thereby is taken as of the order of two minutes.

Assuming that three dough pieces to be proofed are delivered by the conveyor belt 25 into three contiguous compartments in a tray 55, this tray 55 advances in the path as determined by the sprockets 36, 42, 37, 43 and 38 and as it moves downwardly is tilted by engagement of the tilt wheel 60 with the arm 74. The cam 70 is effective as previously explained to position the arm 74 for the tray tilting. The three dough pieces are dumped into separate passageways 82 in the transfer hopper 80 and fall therein. If the doors 85 have been tilted backward and thus positioned for discharge with two minutes of proofing these dough pieces are discharged onto the conveyor belt 84.

If longer proofing is desired, the first set of doors 85, for the shortest proof time, will be closed so that the dough pieces are delivered by the chutes 87 into another tray 55 but in sidewise offset relation to the position which they previously occupied.

A circuit is made by the tray 55 to which these dough pieces have been delivered until it is tilted in the manner previously pointed out. The tilting of the tray 55 thus transfers the proofed dough pieces either for discharge or into another tray 55 in offset relation to the positions previously occupied for further proofing.

While the course of handling of only three pieces has been explained in detail it will be clear that each tray 55 as it comes to the conveyor 25 has a new load added thereto so that the trays 55 are effectively utilized and carry dough pieces for proofing the entire time except during the interval following the transfer by tilting of the entire contents other than those discharged to another tray 55.

Assuming a two minute circuit with the apparatus shown, and dependent upon the setting of the doors 85, selective proof times of the order of two, four, six, eight or ten minutes are available at the choice of the operator.

I claim:

1. A dough proofer for separated pieces of dough comprising a housing having an entrance portion and a delivery portion, members providing a continuous circuitous path between said entrance portion and said delivery portion, a plurality of trays moved by said members, members for controlling the delivery of dough pieces, said last members including members for positioning said trays in discharging condition, and dough transfer members for delivering dough pieces to a tray for a subsequent circuit of said path, said transfer members including a selectively positioned transfer door and a chute communicating with one of said trays controlled by the positioning of said door.

2. A dough proofer for separated pieces of dough comprising a housing having an entrance portion and a delivery portion, frame members in said housing, a plurality of shafts in said housing carried by said frame members having spaced chain supporting elements carried thereby, spaced endless chains carried by said chain supporting elements in a circuitous path between said entrance and said delivery portions, a plurality of trays extending between and pivotally mounted on said chains, said trays being movable with respect to said entrance portion for delivery thereto of dough pieces to be proofed, members for actuating said trays for the discharge of dough pieces therefrom, and members for directing the discharged dough pieces with respect to said delivery portion, said last members including a transfer passageway, and a chute communicating with said passageway and with a tray in offset relation to said transfer passageway.

3. A dough proofer as defined in claim 2 in which a door is interposed between said transfer passageway and said chute for determining the direction of movement of a dough piece.

4. A dough proofer for separated pieces of dough comprising a housing having an entrance portion and a delivery portion, frame members in said housing, a plurality of shafts in said housing carried by said frame members having spaced chain supporting elements carried thereby, spaced endless chains carried by said chain supporting elements in a circuitous path between said entrance and said delivery portions, a plurality of trays extending between and pivotally mounted on said chains, said trays being movable with respect to said entrance portion for delivery thereto of dough pieces to be proofed, members for actuating said trays for the discharge of dough pieces therefrom, and members for directing the discharged dough pieces with respect to said delivery portion, said last members including a plurality of transfer passageways, and a plurality of chutes respectively communicating with said transfer passageways, said chutes being disposed in offset relation to said transfer passageways for delivery of dough pieces to trays for recircuiting movement within said housing.

5. A dough proofer for separated pieces of dough comprising a housing having an entrance portion and a delivery portion, frame members in said housing, a plurality of shafts in said housing carried by said frame members having spaced chain supporting elements carried thereby, spaced endless chains carried by said chain supporting elements in a circuitous path between said entrance and said delivery portions, a plurality of trays extending between and pivotally mounted on said chains, said trays being movable with respect to said entrance portion for delivery thereto of dough pieces to be proofed, members for actuating said trays for the discharge of dough pieces therefrom, and members for directing the discharged dough pieces with respect to said delivery portion, said delivery portion having a plurality of delivery locations corresponding to different proofing time periods, said last members including a transfer chute having a plurality of partition walls for separated passageways communicating with different ones of said delivery locations, a plurality of chutes communicating respectively with said passageways and communicating with a tray at locations offset along the tray with respect to said transfer passageways, and a plurality of movable members interposed between said transfer passageways and said chutes for controlling the delivery of dough pieces to selected ones of said delivery locations or to said chutes for recircuiting movement within said housing.

6. A dough proofer for separated pieces of dough comprising a housing having an entrance portion and a delivery portion, upper shafts, intermediate shafts, lower shafts, said shafts being disposed in parallel relation in said housing and having spaced chain supporting members carried thereby, a pair of spaced endless chains carried by said supporting members in a circuitous path extending in passing relation to said entrance and delivery locations, a plurality of trays extending between and pivotally mounted on said chains, said trays having a plurality of compartments therealong, said trays being movable with respect to said entrance portion for the delivery thereinto at a predetermined location of a dough piece to be proofed, a transfer hopper having a plurality of walls separating a plurality of passageways, members for discharging dough pieces from said trays into said passageways, said delivery portion having a plurality of delivery locations communicating respectively with said passageways, a plurality of chutes communicating respectively with said passageways and extending in offset relation to said passageways for delivery into a tray in offset relation to the location of dicharge by said discharge members, and doors for controlling the movement of dough pieces from said passageways to said chutes, said doors being movable to positions for discharge of dough pieces from said housing at said delivery locations.

References Cited by the Examiner

UNITED STATES PATENTS

| 1,639,061 | 8/1927 | Schiff | 107—7.6 |
| 2,189,243 | 2/1940 | Evans | 107—7.6 |
| 2,622,718 | 12/1952 | Feige | 107—7.6 |
| 2,664,188 | 12/1953 | Rhodes | 107—7.6 |
| 2,670,835 | 3/1954 | Huttmann | 198—31 |

FOREIGN PATENTS

| 1,054,644 | 10/1953 | France. |
| 827,136 | 4/1958 | Great Britain. |

WALTER A. SCHEEL, *Primary Examiner.*

R. W. JENKINS, *Assistant Examiner.*